May 7, 1963   P. HOLD ETAL   3,088,250
AUTOMATED ROLL GRINDER
Filed Oct. 18, 1961   7 Sheets-Sheet 1

INVENTORS
Peter Hold
Alfred T. Parrella
BY Spencer, Rockwell & Bartholow
ATTORNEYS

May 7, 1963  P. HOLD ETAL  3,088,250
AUTOMATED ROLL GRINDER
Filed Oct. 18, 1961  7 Sheets-Sheet 2

INVENTORS
Peter Hold
Alfred T. Parrella
BY Spencer, Rockwell & Bartholow
ATTORNEYS May 7, 1963 P. HOLD ETAL 3,088,250
AUTOMATED ROLL GRINDER
Filed Oct. 18, 1961 7 Sheets-Sheet 4

INVENTORS
Peter Hold
Alfred T. Parrella
BY Spencer, Rockwell & Bartholow
ATTORNEYS

INVENTORS
Peter Hold
Alfred T. Parrella
BY Spencer, Rockwell & Bartholow
ATTORNEYS ＃ 3,088,250
AUTOMATED ROLL GRINDER
Peter Hold, Milford, and Alfred T. Parrella, Newtown, Conn., assignors to Farrel-Birmingham Company, Incorporated, Ansonia, Conn., a corporation of Connecticut
Filed Oct. 18, 1961, Ser. No. 145,900
24 Claims. (Cl. 51—165)

The present invention relates to grinding and relates in particular to machinery useful in grinding large mill rolls automatically in response to signals originating in a perforated tape or similar signal generating means.

In prior art roll grinding machinery and processes the various operations necessary to process a roll such as examining the roll for wear or irregular surface contour, grinding the roll parallel or to a desired degree of convexity or concavity, measuring roll diameter, aligning roll axis, dressing the grinding wheel, maintaining proper pressure between the grinding wheel and the roll, measuring the finished roll and memorizing final roll diameter require a series of manual settings, adjustments or measurements by an attending operator with constant vigilance by the operator throughout the course of the various operations.

Consequently, it is a primary object of the present invention to provide an automatic roll grinding apparatus operable under the control of a programming tape to effect all the above operations to process a roll in sequential steps, automatically, and with virtually no operator help or attention.

It is a further object of the invention to provide a roll grinder in which a series of signal generating probes are employed to effect measurements which facilitate automatic and continuous practice of process steps necessary to finish the roll.

It is a feature of the invention to provide a plurality of movable probes each of which is connected to the armature of linearly variable differential transformers. The probes directly engage the mill roll, are reciprocable through a short stroke of the order of .010 inch and in so doing generate electrical signals in the transformer circuit which are a direct function of the displacement of the probe in a positive or negative direction relative to a zero or null point.

It is well known that in measuring devices of the above class that accuracy is extremely good especially when the stroke of the probe, i.e., armature, is short, eliminating error that would otherwise develop if the stroke were long or if long reach rods or similar structure were employed.

It is a further feature of the invention to provide apparatus employing probes which make it possible to (1) scan a roll for the region of greatest wear, (2) determine the extent of material which must be removed from a roll in grinding it clean, (3) align the longitudinal axis of a roll accurately relative to a fixed reference line, and (4) memorize the final diameter of a finished roll.

It is a further feature of the invention to provide a table upon which the probes are mounted which is coordinately movable. By selectively positioning the table, it is possible to adjust the probes relative to a roll so that the probes contact the roll without having to move in a positive or negative direction beyond their normal stroke or range of excellent accuracy.

It is a further feature of the invention to provide apparatus facilitating the achievement of the above four steps when dealing with rolls of the same or different diameters including utilization of the probe table in cooperation with the probes to memorize or record the final diameter of any finished roll.

It is a further feature of the invention to provide two spaced or end probes whose transformers or bodies are fixed relative to the probe table and an intermediate scanning probe whose transformer is movable linearly along a path generally parallel to the longitudinal axis of the roll being ground operative to locate the region of greatest wear.

It is a further feature of the present invention to impress an artificially generated signal, representing a curved line, upon the signal normally generated by the scanning probe so that the wear measurements developed by the scanning probe are reckoned from said curved line. This feature is especially desirable when it is intended to finish grind a roll with a convex or concave surface.

It is a further feature of the invention to provide a grinding apparatus that automatically "short" strokes in the event end portions of the roll are higher than the intervening center portion to avoid grinding "air." Thus, the grinder automatically strokes to and fro longitudinally over a short distance corresponding to the axial length of the high area until it is ground down to a predetermined diameter relative to the low central region. The grinder then shifts to the opposite end for similar operations. Thereafter the grinder stroke extends from end to end of the roll.

It is a further feature of the invention to provide an automatically adjustable roll support or rest operative in response to appropriately timed signals from the programming tape in cooperation with the end probes to move one end or neck of the roll inwardly or outwardly in a horizontal plane an amount corresponding to a correction developed from readings signalled by the end probes.

It is a still further feature of the invention to provide a grinding wheel probe which follows the diameter of the wheel as it is reduced in diameter or radius through wear during grinding. This probe develops a signal which is fed into a wheel dresser assembly carried by the grinding head operative to continuously position a diamond point or other wheel dressing means to sweep across the face of the grinding wheel to dress the wheel automatically in response to periodic signals originating in the grinding machine programming tape.

It is a still further feature of the invention to provide improved means for controlling the advance or infeed of the grinding wheel assembly towards the roll being ground effecting fast, slow and ultimately an exceedingly precise feed for moving a grinding wheel in small increments.

It is a further feature of the invention that when it is desired to provide a finished roll with a convex or concave surface, the electrical signal ordinarily generated in the scanning probe is modified with an additional electrical signal, automatically generated, which is a function of the desired concavity or convexity so that although the scanning operation occurs along a straight line the wear measurements obtained are automatically adjusted for the desired concavity or convexity.

The coordinately movable proble table makes it possible to advance the table toward the roll under control of the programming tape so that one of the end probes contacts the end of the roll. The probe table is advanced until the contacting probe moves its armature to a "null" position, electrically, defined as a zero position or reference point, from which inward or outward movements reckoned in a radial direction relative to the longitudinal axis of the roll are measured as positive or negative values.

Since the position of the probes upon the table is known and the distance between the longitudinal axis of the roll and the probe table is a measurable value, it is apparent that a probe in contact with a roll is also measuring radius or diameter of the roll at the point of contact.

As soon as the aforementioned end probe nulls, as described above, control of the infeed of the probe table shifts to the center or scanning probe which begins sweeping longitudinally from one end across the face of the roll scanning for the region of deepest wear.

The probe table follows the scanning probe inwardly toward the roll recognizing only those signals which indicate a worn area deeper than any previously scanned wear. As the roll is scanned and the signal representing the greatest wear is sensed and recorded, the probe table moves inwardly to null the center or scanning probe.

This occurrence deflects each end probe and sets up a signal in each end probe which indicates the height of metal at the ends of the roll (which ordinarily wears less than intervening portions) which is a measure of the amount of metal which must be ground from the roll to clean up the roll to eliminate all low spots.

After the extent of required grinding is established, memorized, and recorded on a suitable readout device, the programming tape commands a grinding head to move into a working position relative to the roll on the side of the roll opposite the probe table. The pressure between a grinding wheel and the roll is controlled by the load current in the grinding wheel motor circuit in well known fashion.

Since the ends of the roll are usually high, having worn less, the tape directs the grinder to one end of the roll where short stroking is effected until the high area is reduced to within a predetermined dimension of the low point.

The probe table and thus the end probes move into contact with the roll cyclically after each grinding stroke to sense the diameter of the roll and to compare the roll diameter at the end being ground to the diameter at the low point. When the differential of the end over the low point is of the order of about .003 inch, the short stroking automatically stops and the grinder is withdrawn and shifts to the opposite end of the roll. The opposite end is ground in similar fashion.

Next the grinder traverses the full length of the roll until at a predetermined point in the grinding cycle (usually determined by grinding to within about .001 inch of the low point) the programming tape calls for a roll aligning operation.

During the aligning step, grinding stops, the grinder is withdrawn and a measurement is taken to check the parallel relationship of the roll axis to the path traversed by the grinder. The probe table advances toward the roll until the end probes contact the roll and are deflected. If the axis is not parallel a correction is automatically developed and the roll is moved, preferably at the tail stock, inwardly or outwardly depending upon the signal of the error to establish parallel lines between the roll axis and the path traversed by the grinder.

The correction is developed by satisfying an equation which has been derived for all classes of rolls; the equation contains two variables and a constant. The variable is the deflection of one end probe $P_1$ and the deflection of the other end probe $P_2$ while K is a factor related to roll diameter, length of roll face and distance between headstock and the tail stock adjustment point.

The value of K is computed for each class of rolls and the proper value for the roll being ground is fed electrically into the end probe circuit at the alignment step after having been first selected manually by an operator on a variable resistor prior to operation of the grinder.

The derivation of the equation shows that when the deflection of $P_1$ in inches times K equals the deflection of $P_2$ in inches, a linear measure of deflection is established in probe $P_2$ which represents a correction for obtaining parallelism of the roll axis with the path of the grinding wheel.

When probes $P_1$ and $P_2$ are deflected to the extent that the above equation is satisfied, the probe table stops and the end probes are separated electrically. Next a motor operating an adjustable roll neck support at the tailstock of the machine operates to move the corresponding roll neck and, thus, the roll (inwardly or outwardly depending upon the sign of the correction) until the probe $P_2$ again deflects and reaches a null position. At this occurrence the derivaiton shows that the axis of the roll has been moved to align it in parallelism with the path traversed by the grinding wheel.

After alignment, grinding along the full length of the roll is resumed usually for a definite number of passes, signals for which have been incorporated into the control tape by the individual who has programmed the grinding cycle.

Before a final or finish grind, it is frequently desirable to dress the grinding wheel and this is effected automatically upon a signal originating in the control tape.

At this signal a diamond point or other grinding wheel dresser means carried by the grinding head is caused to sweep across the grinding wheel face with a predetermined infeed and for a given number of strokes to dress the grinding wheel.

Next the tape calls for a given number of passes of light grinding.

Next the end probes compare signals and if the variation of diameter from end to end is no more than a given amount, .001 inch for example, the tape signals the end of operations.

If the roll ground is the first of a series of rolls and it is desired to grind other rolls to matching diameters, the dimension signals read by the end probes and the center probes are recorded and memorized for use later in checking subsequent rolls.

A roll grinding apparatus embracing certain principles of the present invention may comprise a frame or bed, a head stock and a tail stock carried by the frame for rotatably supporting and driving a mill roll, a grinding wheel operative to sweep to and fro across the face of a roll and along a pre-determined path, a plurality of movable probe means operative to contact the roll to generate signals, said signals being readable to indicate (1) the region of the roll having the greatest wear, (2) the alignment of the roll axis of rotation relative to the path traversed by the grinding wheel, (3) the wear of the grinding wheel, (4) the diameter of the roll and the position of a wheel dresser assembly.

Other features and advantages of the invention will become more apparent from an examination of the following specification when read in conjunction with the appended drawings in which.

Figure 1:
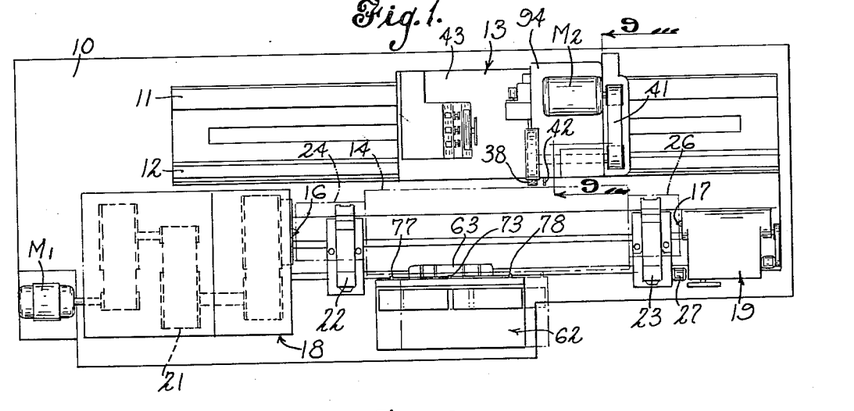
FIG. 1 is a plan view of a roll grinding machine embracing the principles of the present invention.
Figure 2:
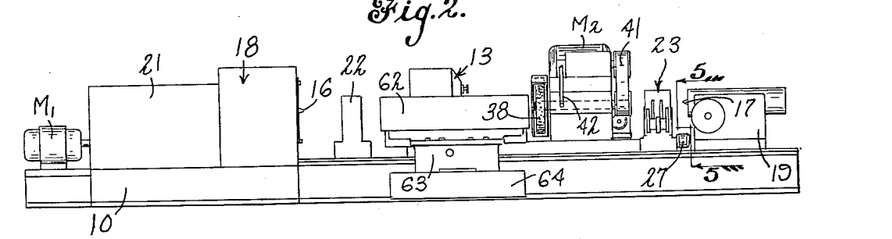
FIG. 2 is a front elevation of the machine in FIG. 1.
Figure 3:
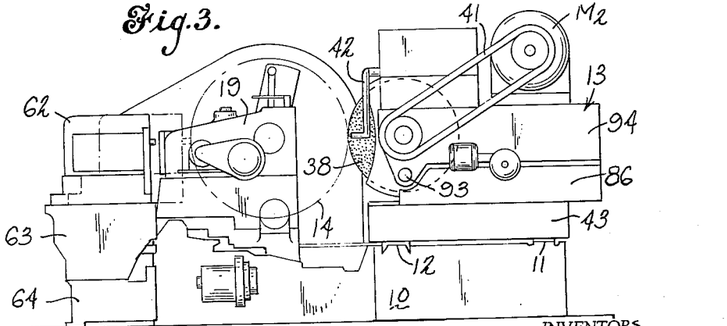
FIG. 3 is an end view of the illustration of FIGS. 1 and 2 as viewed from the right side.

Referring now to the drawings and in particular to FIGS. 1, 2 and 3, there is shown a bed or frame 10 carrying ways 11 and 12 in turn supporting a grinding assembly 13 driven to and fro in reciprocatory fashion along the ways 11 and 12 and across the face of a mill roll 14.

The mill roll 14 is aligned axially between cone points 16 and 17 of head stock 18 and tail stock 19, respectively, in the exemplary embodiment of the invention.

The mill roll is chucked to the head stock by suitable dogs or driving clamps and is driven rotatably by motor $M_1$ by suitable mechanical reduction means 21.

The weight of the roll 14 is not borne by cone points 16 and 17 but is supported at each end by suitable supports or rests 22 and 23 which engage the journal or neck portions of the rolls indicated by the reference numerals 24 and 26.

Figure 5:
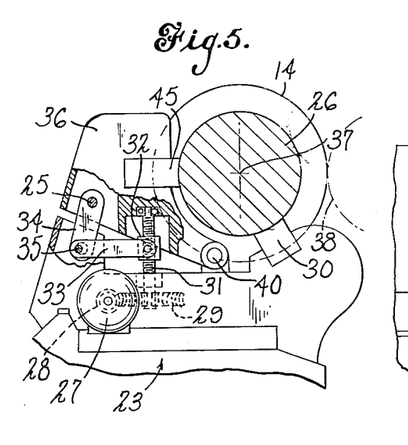
FIG. 5 is a sectional view of FIG. 2 as viewed in the plane of the line 5—5 and in the direction of the arrows.

Referring to FIGS. 1, 2 and 5, the exemplary embodiment of the invention reveals that the rest 23 near the tail stock of the grinding apparatus is adjustable to move the right roll neck (as viewed in FIG. 1) inwardly and outwardly relative to the grinding wheel 38 to satisfy the alignment correction discussed previously.

Reversible motor 27 receives an electrical signal which is a measure of the correction and the motor operates to drive worm 28 engaged with bull gear 29 effective to rotate lead screw 31 to raise or lower nut 32 depending upon the sign of the correction and the direction in which motor 27 is rotated.

Nut 32 operates link 33 upwardly or downwardly, as the case may be. Link 33 is keyed to and rotates eccentric shaft 35. Shaft 35 carries two links 34 (only one shown) which support arm 36 through pin 25. The links 34—34 move upwardly or downwardly to raise or lower arm 36 pivoting about pin 40. Slight upward or downward motion of arm 36 causes neck support bearing 45 to move inwardly or outwardly to swing the tail stock end of the roll 14 toward or away from the grinder 38 about bearing 30.

In FIGS. 1 and 2 the reference numeral 38 designates a grinding wheel driven by motor $M_2$ through belt 41. A grinding wheel probe 42 contacts and follows the face of the roll 14 as the grinding wheel assembly moves towards the roll. The probe 42 is operative cyclically to (1) control the feed of the grinding wheel toward the roll and to (2) generate a signal transmitted to a wheel dresser assembly which will be described in greater detail hereinafter.

Figure 6:
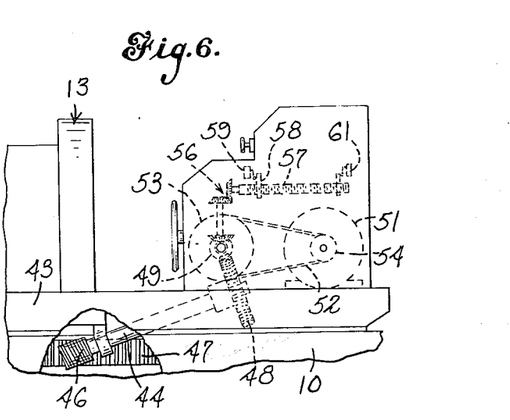
FIG. 6 is an elevational view of a portion of the illustration of FIG. 1 as viewed from the rear and with certain parts broken away to show the grinding wheel carriage drive means.

FIG. 6 shows a portion of the grinding machine as viewed from the rear. Certain parts of the bed are broken away to show the mechanism for driving the carriage 43 which supports the driving wheel assembly. Shaft 44 is rotatably supported by the carriage 43 and is formed at one end with a worm gear 46 operative to contact and move along rack 47 rigidly fixed to the machine bed 10. The opposite end of the shaft 44 carries a bull gear 48 driven by a worm 49 in turn driven by carriage motor 51 by means of a belt 52 and pulleys 53 and 54. The carriage 43 is driven first in one direction and then in the reverse direction by reversing the motor 51.

Motor reversal is accomplished through a gear train indicated by the reference numeral 56 powered from pulley 53 effective to drive a lead screw 57. In one direction of motion of the carriage, nut 58 is moved by the lead screw from reversing switch 59 to reversing switch 61 whereupon rotation of motor 51 is reversed and the nut 58 travels back to switch 59 whereupon motor rotation is again reversed. Obviously, the disposition of the switches 59 and 61 in conjunction with the lead formed on the screw 57 determine the stroke traversed by the grinding wheel assembly.

*Probe Table Assembly*

Figure 4:
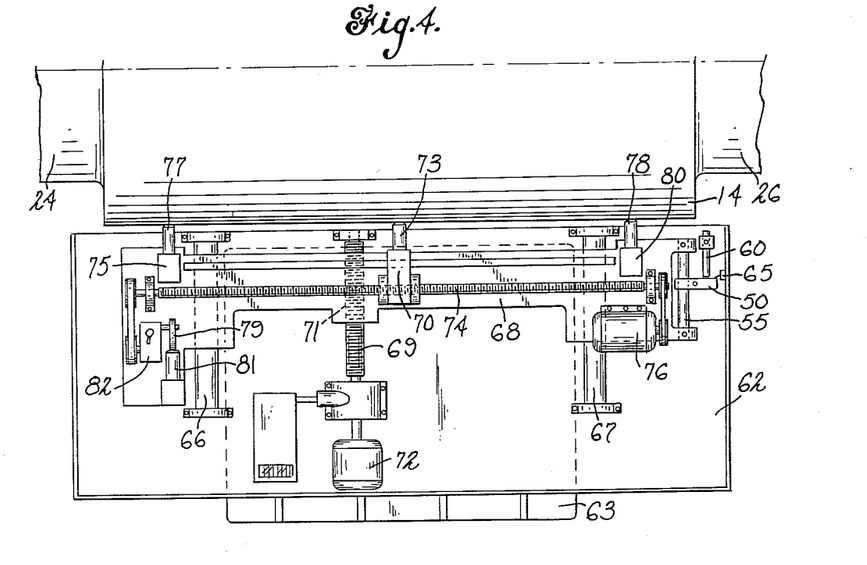
FIG. 4 is a plan view of a portion of FIG. 1 with certain parts omitted to show the details of the probe table.

Referring to FIG. 4, there is shown a top view of a portion of FIG. 1 illustrating a coordinately movable probe table 62 adjustable towards and away from roll 14 by sliding the table inwardly and outwardly on base 63. The table 62 is adjustable longitudinally along the face of the roll by moving base 63 on sub-base 64 (see FIG. 2). Probe table 62 supports two guide rods 66 and 67 which support probe carriage 68. The probe carriage 68 is movable toward and away from the mill roll 14 by a lead screw 69 in threaded engagement with the carriage, as at 71, and driven by a reversible motor 72. The probe carriage 68 supports a first probe hereinafter sometimes referred to as a scanning or sweep probe 73 mounted upon a lead screw 74. Reversible motor 76 is operative to drive the screw 74 effective to cause probe 73 to sweep across or scan the face of the roll 14 to "hunt" for regions of the roll face which are "low" or which are worn.

The rear of the probe 73 is connected to the armature of a linearly variable differential transformer 70 and an electrical signal is generated by deflection of the probe relative to the transformer which, when compared to signals generated by other signal probes 77 and 78, to be described hereinafter, represents a measure of the difference between the highest and lowest point on the face of the roll.

These signals when converted to units of linear measure indicate a reference position of the probe table and the amount of material which must be removed from the roll to refinish its face.

For example, in determining the point of greatest wear, i.e., low spot on roll, the programming tape signals motor 72 to move carriage 68 toward roll 14.

One of the probes 77 or 78 will contact the face of the roll before the other (because the roll is worn and is not perfectly aligned) and will deflect to move its armature relative to its transformer 75 or 80, as the case may be. The carriage 68 continues toward the roll until the roll-contacting probe reaches a null as described previously. Upon this occurrence control of the probe carriage 68 shifts to probe 73 which begins sweeping from left to right as viewed in FIG. 4 starting from a position as close to probe 77 as possible.

The probe carriage 68 driven by the motor 72 follows the probe 73 as it scans the face of the roll recognizing and moving inwardly only in response to those probe signals which represent a low point which is lower than any point previously scanned.

Ultimately the lowest spot is read as a reference position of the table and the signal generated is memorized as the advancing carriage nulls probe 73.

Upon this occurrence both end probes 77 and 78 are deflected and each generates a distinct signal. Thus, the signals of end probes 77 and 78 when converted to linear measure are indicative of the amount of material that must be removed from the face of the roll relative to the low spot to refinish the roll face.

It should be noted that ordinarily the ends of a roll show very little or no wear relative to the center portion.

If it is desired to finish grind a roll with a convex or concave contour, an additional signal generated by a contour cam 79 in cooperation with contour cam probe 81 is fed into the sweep probe circuit modifying the signal ordinarily generated by the sweep probe 73 so that probe 73 effectively measures the worn area relative to a concave or convex curve which will ultimately be ground upon the roll.

Obviously, cam 79 can be replaced or set to any desired eccentricity depending upon the degree of concavity or convexity desired in the finished roll. Cam 79 is driven by lead screw 74 (or can be rendered ineffective as when grinding a parallel roll) by appropriate manipulation of gear change box 82.

As stated previously, the probe carriage also functions as a reference point in the event it is desired to grind other rolls to the same diameter after a first roll has been refinished. To accomplish this function, the right side of probe carriage 68, as viewed in FIG. 4, is formed with a bar 50 which frictionally engages rod 55.

As the probe carriage 68 moves towards the roll 14, bar 50 moves with the carriage 68 until it engages stop 60 causing the bar to slide along rod 55 relative to the probe carriage. At the completion of grinding a given roll, all probes cycle into contact with the roll and the carriage advances until all probes are nulled.

All probes can be nulled simultaneously because the roll is finished and accurately aligned.

At this time the position of the bar 50 relative to the rod 55 is a bench mark or reference point.

Stated otherwise, the position of the bar 50 relative to the rod 55 with the probes nulled and in contact with the roll accurately represents the diameter (or radius) of a finished roll.

Next the probe carriage is retracted and the finished roll removed. Another roll is placed in the machine to be ground to the same diameter as the first roll.

Microswitch 65 is placed in circuit with the probe carriage feed motor 72.

Grinding of the new roll begins and is conducted automatically under the control of the programming tape.

In the course of the grinding operation, the probe carriage advances towards the second roll, as previously described, carrying with it the bar 50.

Microswitch 65 is so disposed relative to the stop 60 that as the bar 50 approaches and touches the stop, the switch 65 is actuated shutting down the carriage feed motor 72.

At this time the probes 73, 77 and 78 are deflected and the deflection is a measure of the amount of material which must be removed from the second roll to null the probes.

Grinding continues until probes 78 is nulled and, thus, with the bar 50 in the identical position relative to rod 60, as it was at the termination of grinding of the first roll, one is assured that the second roll matches the first.

FIGS. 7, 8, 9 and 10 illustrate the grinding head and means for advancing the grinding wheel towards a mill roll such as roll 14. The structure of the grinding head includes grinding head carriage 43 which is movable to and fro longitudinally of the mill roll along the ways 11 and 12 is formed in the grinding machine base 10. The carriage 43 is driven by worm 46 which engages rack 47, as previously described, relative to FIG. 6.

Sub-base 86 rides on carriage 43 and is movable toward and away from the mill roll along way 87 by a lead screw 88 fixed to the carriage 43 and on which screw a nut 85a is revoluble and axially movable, the nut being confined in housing portion 85 of sub-base 86. A gear 89 is fast on the nut in concentric relation thereto and is driven by worm 91 carried by shaft 92. The screw 88 extends with clearance through the housing portion 85.

The shaft 92 (FIG. 7) is driven at a first or fast speed by a reversible motor $M_8$ and at a second or slow speed by a reversible motor $M_9$. Thus, the grinding head may be advanced toward the mill roll at two different speeds. Pivoted to the sub-base 86 by means of pin 93 is a grinding wheel head 94 carrying grinding wheel 38 driven from motor $M_2$ by belt 41 as stated previously.

Figure 7:
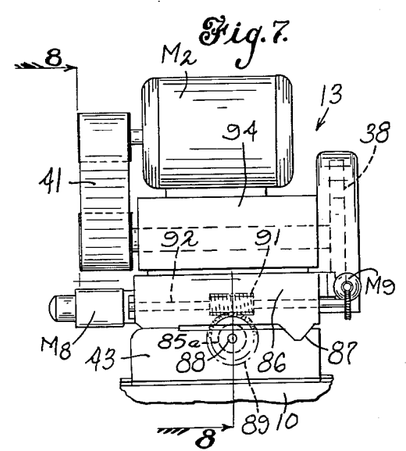
FIG. 7 is an elevational view of another portion of the illustration of FIG. 1 as viewed from the rear showing the means for driving the grinding wheel head toward and away from the roll.
Figure 8:
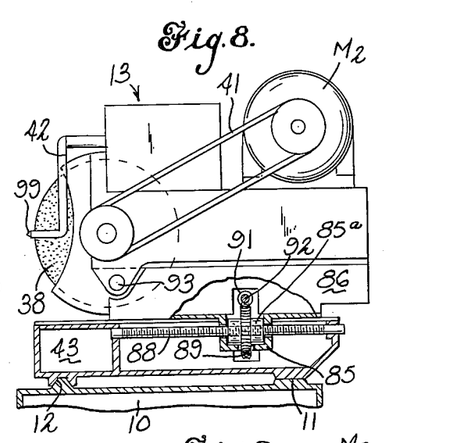
FIG. 8 is a sectional view of FIG. 7 taken along the line 8—8 and viewed in the direction of the arrows.
Figure 9:
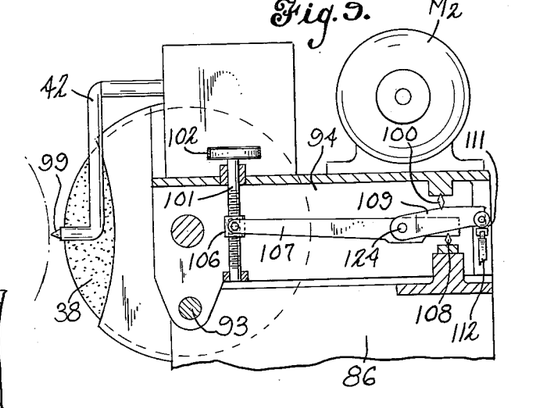
FIG. 9 is a sectional view of FIG. 1 and viewed in the plane of the line 9—9 showing the means for tilting the grinding head.

Grinding wheel probe 42 is formed with a cone point 99 which projects beyond the periphery of the wheel. The probe is operable cyclically to engage the mill roll being ground and as the wheel approaches the roll the probe is depressed reltaive to the grinding wheel to actuate switches which control the feed of the grinding wheel (motors $M_8$ and $M_9$) toward the mill roll. In addition to the aforementioned fast or coarse feed and the slow or fine feed, there is a third means for feeding the grinding wheel towards the roll.

This third means involves structure for pivoting the grinding wheel about pin 93. In timed sequence following the fast and slow infeed operations, reversible motor $M_{11}$ (FIG. 10) is actuated to drive lead screw 101 through endless belt 102 and one-way clutches 103 and 104. These one-way clutches are provided so that when motor $M_{11}$ is operated to drive belt 102 in a clockwise direction, for example, one clutch drives and the other freewheels while, when the belt drive is reversed, the opposite clutch drives and the first clutch freewheels. Rotation of the lead screw 101 in a direction which causes nut 106 to run up the screw 101 is effective to raise long lever 107 causing it to pivot about knife edge 108.

Figure 10:
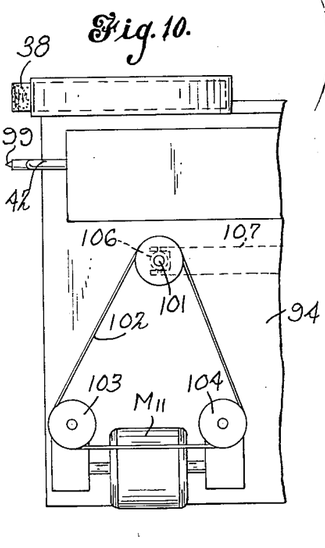
FIG. 10 is a top view of the grinding head.

This action is effective to raise lever 109 causing it to pivot about point 111 in turn raising the grinding head 94 through knife edge 100. The head 94 pivots about pin 93 and the grinding wheel 38 is moved precisely and by small increments into working contact with the roll 14. The extent of pivoting is controlled conventionally by moving the grinding wheel into the roll until the grinding wheel motor $M_2$ develops a predetermined load current.

It is also possible to set up on the programming tape a definite amount of infeed for the grinding wheel per stroke across the roll by energizing motor $M_{11}$ to operate in the appropriate direction and for a definite interval depending upon the desired infeed.

Alternatively, the grinding wheel can be set to feed continuously at a very low rate.

When it is desired to introduce convexity or concavity into the roll while grinding, the short lever arm 109 is operated automatically by offsetting an eccentrically adjustable circular ring or cam 112 in the manner, for example, disclosed and described in U.S. Patent No. 2,814,914 to Hultgren.

In FIGS. 11, 12, 13 and 14, the mechanism for introducing curvature to the roll face is disclosed including means operable manually from the main operator control panel for offsetting or phasing the eccentric ring 112 to develop the desired convex or concave contour as the grinding wheel sweeps across the face of the roll.

Figure 14:
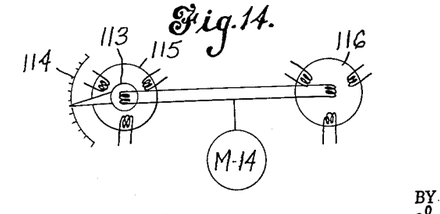
FIG. 14 is an electrical schematic of the Selsyn unit used to select and set the desired convexity and concavity.

Control knob 113 located at the operator control panel is settable at a desired curvature calibrated on indicator 114. The setting of knob 113 actuates a Selsyn unit 115—116 and motor $M_{14}$ operates to drive an offsetting screw 117 to position the ring 112.

This action occurs through bevel gears 119 and 121 and continues until the eccentricity of the ring 112 relative to the shaft 122 corresponds to the "convex or concave" setting of the knob 113. With the ring 112 set at the desired eccentricity it oscillates (rotates first in one direction and then in the opposite direction) through a predetermined arc as the grinding wheel head travels to and fro across the face of the roll being ground.

Figure 11:
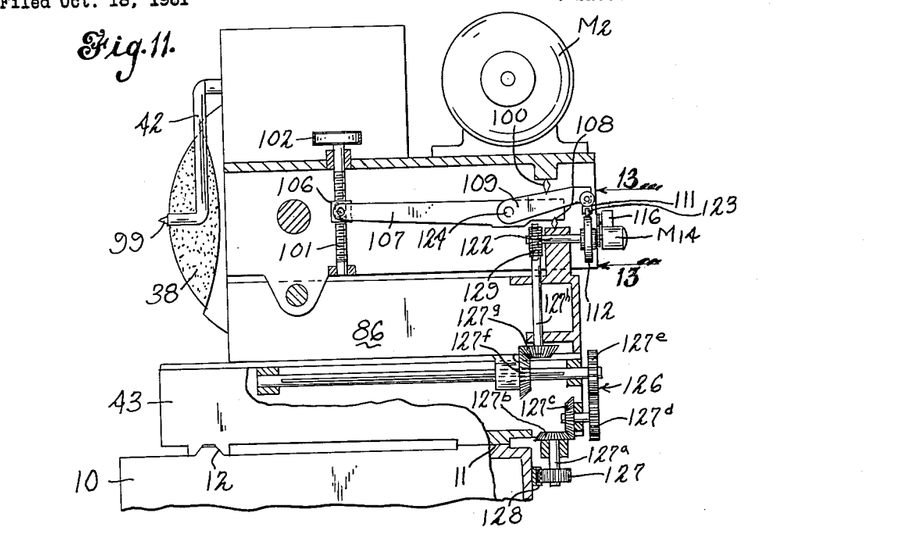
FIG. 11 is a side view of the grinding head similar to the illustration of FIG. 9 with portions broken away to show the crowning cam drive.
Figure 12:
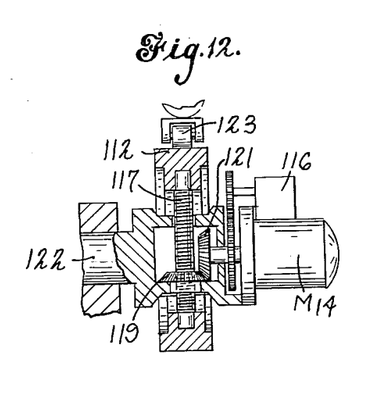
FIG. 12 is an enlarged view of a portion of FIG. 11 showing the details of the crowning cam drive.

The exterior of the ring 112 acts as a cam surface for the follower 123 and the ring's eccentric position causes the follower to ride up and down as the ring oscillates with the result that short lever 109 is moved upwardly or downwardly about pin 124 to cause the grinding wheel 38 on the head 94 to move toward or away from the roll rhythmically and in synchronism with the longitudinal traverse of the grinding wheel to develop a convex or concave face as desired.

Figure 13:
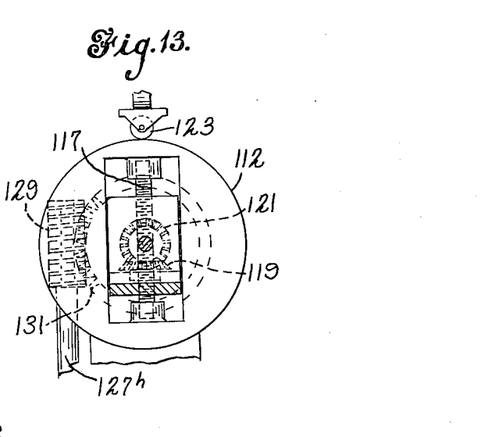
FIG. 13 is a sectional view of FIG. 11 (somewhat enlarged) as viewed in the plane of the line 13—13 and in the direction of the arrows.

The ring 112 is driven through a gear train indicated by the reference numeral 126 where the motion originates as spur gear 127 follows fixed rack 128 as the grinder assembly moves back and forth relative to the rack in traversing the face of the roll. Spur gear 127 keyed to shaft 127a drives bevel gears 127b and 127c. The spur gears in turn drive gears 127d and 127e to transmit power to bevel gears 127f and 127g and thence to shaft 127h. Power is ultimately delivered to shaft 122 by the cooperation of worm 129 with gear 131 (FIG. 13).

Grinding Wheel Probe and Wheel Dresser

Figure 15:
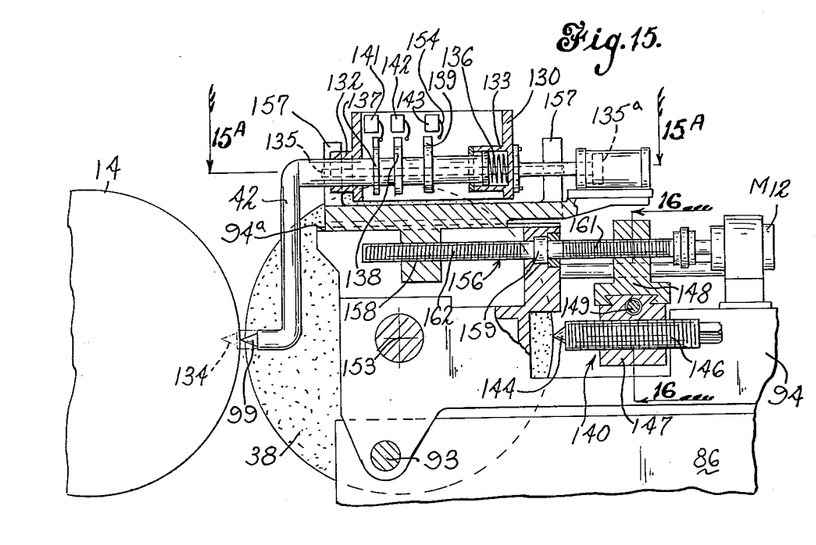
FIG. 15 is a view similar to the illustration of FIG. 9 with parts broken away to show the cooperation between the grinding wheel probe and the grinding head feed switches.
Figures 15A, 16:
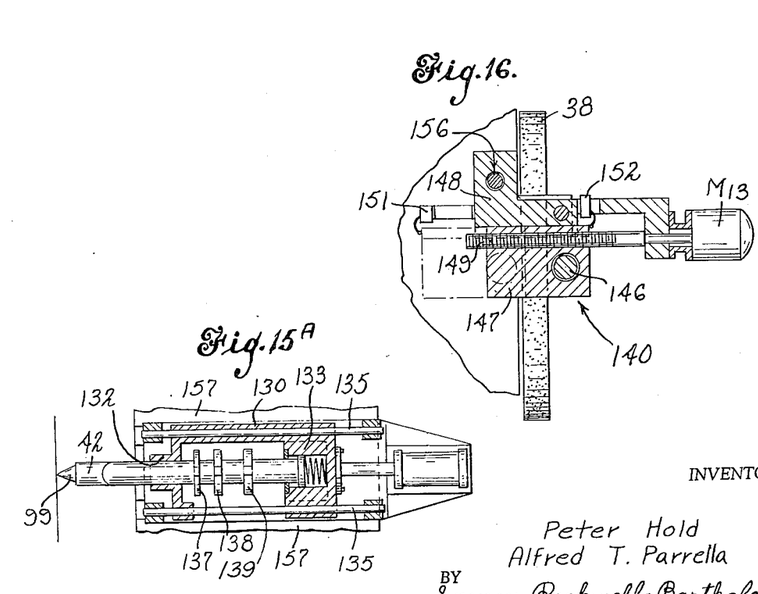
FIG. 15A is a sectional view of FIG. 15 as viewed in the plane of line 15A—15A and in the direction of the arrows.
FIG. 16 is a sectional view of FIG. 15 as viewed in the plane of the line 16—16 and in the direction of the arrows illustrating the wheel dresser drive means.

FIGS. 15 and 16 show the details of the grinding wheel probe and the grinding wheel dresser assembly. The grinding wheel 38 is shown approaching the roll 14. The grinding wheel probe 42 is slidably supported by bearings 132 and 133 formed in box 130 in turn slidably mounted upon guide rods 135—135 as shown in FIG. 15A. The probe normally projects beyond the face of the wheel and is in contact with the roll cyclically. The probe shown in FIG. 15 has moved from the dotted-line position indicated by the reference numeral 134 to the solid-line position against the resistance of coil spring 136. Hydraulic piston 135a is utilized to move box 130 along rods 135—135 as desired. The probe 42 is fitted with three collars 137, 138 and 139 operable to engage and actuate switches 141, 142 and 143, respectively.

Switch 141 is normally closed and provides power to the first or fast feed motor $M_8$ (see FIG. 7). As the grinding wheel approaches the roll, the cone point 99 of the probe contacts the roll and continued motion of the wheel causes the probe to move to the right relative to the wheel and relative to box 130 (as viewed in FIG. 15) until switch 141 is opened by the collar 137 stopping motor $M_8$ and collar 138 closes normally open switch 142 to operate the second or slow feed motor $M_9$. Continued motion of the wheel toward the roll will continue to drive the probe until collar 138 opens the slow speed motor switch 142 just before the wheel contacts the roll effective to stop the slow speed motor $M_9$ and to start the tilt motor $M_{11}$. The last small increment of the approach of the grinding wheel toward the roll is accomplished by pivoting or tilting the wheel about the pin 93 as previously described.

Tilting motion of the wheel toward the roll is ultimately stopped by the aforementioned amperage control device (FIG. 17) in circuit with the grinder wheel motor responsive to a predetermined maximum amperage or current flow in the grinding wheel motor circuit.

The grinding wheel assembly is fitted with grinding wheel dresser means indicated generally by the reference numeral 140 and comprising a diamond point 144 adjustable axially to compensate for wear of the point by carrying screw 146. The diamond point 144 and screw 146 are supported threadedly in block 147 in turn dovetailed into carriage 148. The block 147 is driven relative to the carriage by a lead 149 powered by reversible motor $M_{13}$ to cause the diamond point to sweep across the face of the grinding wheel to dress the wheel in response to a signal originating in the grinding machine programming tape. Motor reversing switches 151 and 152, disposed as shown in FIG. 16, limit the stroke of block 147 so that the diamond and its supporting screw 146 sweep to and fro from the dotted-line position to the solid position shown.

Since dressing of the grinding wheel occurs automatically and in response to periodic signals incorporated into the grinding machine programming tape, it is necessary to have the diamond point 144 conditioned or positioned at all times to one side of the wheel or the other (see FIG. 16) at a distance from the center of rotation of the grinding wheel 38 such that when the diamond point is called upon to sweep across the face of the wheel, it will contact and dress the wheel. This conditioning or positioning of the diamond point relative to the radius of the grinding wheel is accomplished by means including the probe 42, the collar 139, limit switch 143, and switch actuating arm 154.

The wheel dresser carriage 148 is supported by and is in threaded engagement with a lead screw 156. The lead screw is driven by motor $M_{12}$ and is also in threaded engagement with probe carrier 157, as at 158, which slidably supports probe 42 through box 130 and the bearing elements 132 and 133. The probe carriage is slidably mounted on the grinding head 94, as at 94a, for movement toward and away from roll 14. Bearing 159 formed in the grinding head supports the screw 156 and prevents axial motion of the screw relative to the head.

Threads on the screw 156, indicated by the reference numeral 161, are right-hand threads while threads, indicated by the reference numeral 162, are left hand. Thus, operation of the lead screw 156 will develop "turn buckle" action. That is, rotation of the screw in one direction draws the probe carriage 157 and the wheel dresser carriage 148 toward one another while rotation in the opposite direction separates these members. The diamond point 144 is positioned ready for dressing the grinding wheel in following fashion: Assume that limit switch 143 is normally open and that switch arm 154 and diamond point 144 are in the respective positions shown in FIG. 15. As the grinding wheel 38 wears away, the probe 42 moves to the right since point 99 follows the radius of the wheel. Clearance develops between the diamond point 144 and the wheel periphery.

As the probe 42 moves to the right (FIG. 15), collar 139 contacts arm 154 to close switch 143 and lead screw motor $M_{12}$ is energized. Rotation of the screw occurs in a direction which draws diamond carriage (carrying the diamond point 144) to the left toward the wheel 38 while the probe carriage is drawn to the right carrying switch 143 to the right relative to the probe 42.

As soon as the probe carriage 157 and switch 143 move a distance equal to the wear of the grinding wheel (distance probe 42 was depressed to the right due to grinding wheel wear), switch arm 154 returns to its normal position and switch 143 opens to deenergize lead screw motor $M_{12}$.

Since the pitches of right-hand screw threads 161 and left screw threads 162 are identical and there is no axial motion in lead screw 156, the diamond point 144 will be advanced to the left by an amount exactly equal to the wear of the grinding wheel.

Roll Alignment

Figure 18:
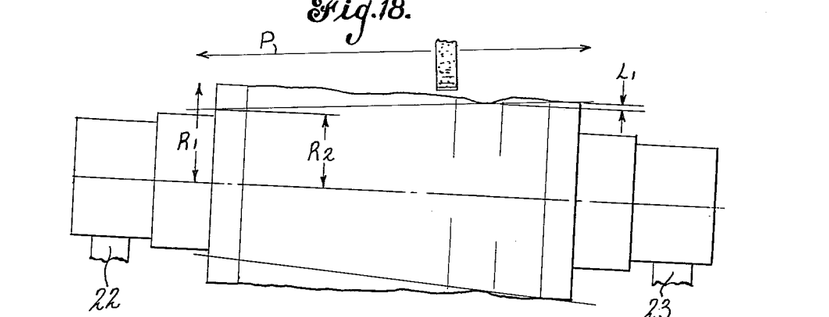
FIGS. 18 through 20 constitute a series of schematic diagrams illustrating conventional process steps for grinding and aligning rolls to remove worn or otherwise damaged areas.

In FIGS. 18 through 23 the operation to grind a roll and to align the axis of the roll parallel to the linear path traversed by the grinding wheel is shown. FIG. 18 is a plan view of a conventional grinder with the roll located with its axis at some degree of misalignment in relation to the path P of the grinding wheel, the degree being exaggerated for purposes of illustration. In practice, it is well recognized that rolls cannot be placed in perfect alignment in grinding machines because of minor changes in the position of the roll supports or distortions of the machine parts caused by temperature changes or foundation settling. In manual operation of the grinder, it is customary to rough grind until the roll is cleaned up at the lowest area which is shown as an amount $L_1$ below the original radius $R_1$.

Figure 19:
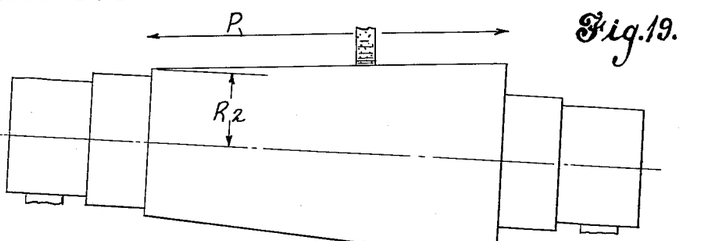
Figure 20:
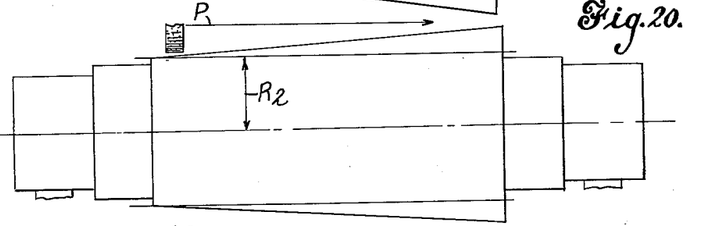

FIG. 19 shows this roll as it appears when cleaned up conventionally and FIG. 20 shows the cleaned up roll after the roll has been aligned to bring its axis parallel to the path of the grinding wheel.

Alignment may be effected by moving one of the journal supports or the tail stock center an appropriate amount. After aligning, the roll will be ground further removing a portion thereof to bring it to a parallel condition and its diameter will be twice $R_2$.

Figure 21:
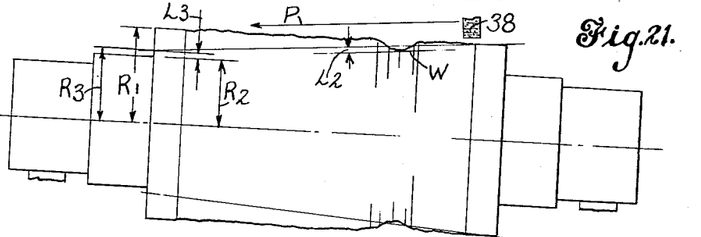
FIGS. 21 through 23 constitute a series of schematic diagrams illustrating steps in our improved process for grinding and aligning rolls to remove worn or otherwise damaged areas while insuring that a minimum of metal is ground from the rolls.
Figure 22:
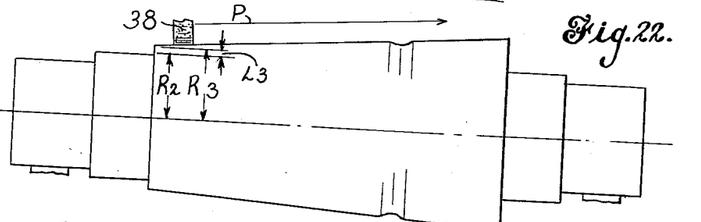
Figure 23:
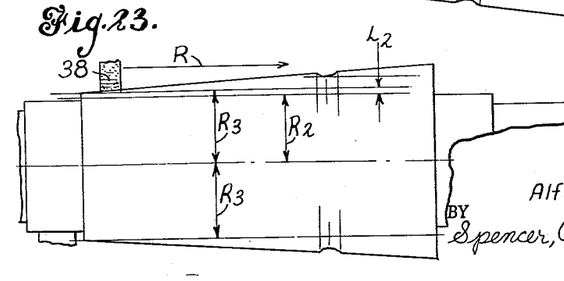

FIG. 21 is similar to FIG. 18 and illustrates a typical first grinding step. The first grinding step is terminated when the roll is ground a predetermined amount $L_2$ above the lowest worn area. This represents a roll radius of $R_3$, while if one ground to the lowest worn area, the roll radius would be $R_2$ (see FIG. 21). At the conclusion of this first rough grinding, the roll will appear as shown in FIG. 22 just prior to alignment. FIG. 23 shows the same roll directly following alignment. This roll can now be finish ground parallel at a radius $R_3$ or at diameter of $2 \times R_3$.

By referring back to FIG. 21, it can be seen that radius $R_3$ is longer than $R_2$ and, therefore, the roll can be cleaned up at a larger diameter than would be possible during normal manual grinding without the use of the probes and probe carriage of the present invention. This difference between $R_3$ and $R_2$, marked $L_3$, is usually of the order of several thousandths of an inch, and is a substantial portion of the amount removed from the roll during each conventional grinding.

It is not possible to control and measure a grinding operation consistently and with accuracy within the range of several thousandths of an inch using manual procedures of the prior art.

Thus, to be certain that a roll will "clean up," the operator of a manually controlled grinder will grind down to the lowest worn spot, i.e., grind down to radius $R_2$ corresponding to the bottom of worn spot W in FIG. 21.

Th probes and probe carriage of the present invention having inherent features of high accuracy previously described make it possible for an experienced grinding programmer to predict and select a value of $L_2$ (FIG. 21) at which it will be safe to stop grinding and perform the aligning step with complete assurance that the roll will "clean up" with the finish grinding passes.

If it is assumed that in a manual grinding operation an operator grinds .010 inch from the roll radius in cutting down to the bottom of the low spot and that the dimension $L_2$ represents .002, one can readily determine that the process steps and apparatus of the present invention make it possible to save 20% of the shell of the roll. This represents a substantial increase in roll life and a substantial saving in capital expenditures.

As stated previously, the probes 73, 77 and 78 make it possible to grind to a predetermined amount above or below a lowest worn area.

In contrast, a grinder device under manual control, without the benefit of probes, is only as effective as the estimation of the operator who will frequently remove too much or too little stock relative to the lowest worn area.

Operation

The grinding machine is operated in response to signals generated by a tape which has been programmed in a well-known manner with the various machine operations in desired sequence. The tape reader or tape-controlled selector shown schematically in FIG. 17 operates to initiate the several operations through signals resulting from the reading of the tape.

First the operator places a worn roll in the grinding machine between the head stock and tail stock centers. Driving dogs are clamped to the roll and the weight of the roll is borne by the neck supports 22 and 23. The operator may position selector knob 113 to seelct a concavity or convexity in the surface of the finished roll, if curvature is desired.

The probe table is positioned centrally of the ends of the roll and is automatically moved toward the roll so that the probes 73, 77, 78 come within a working distance of the roll on the side thereof opposite from the grinding head. At approximately the same time the "start" button is depressed to iniate rotation of the roll. The first end probe to contact the roll is nulled. Next the center or sweep probe 73 scans the roll for the area of greatest wear. The worn area may be a peripheral groove of annular form or an isolated pocket of other form and approximating in area the size of an individual's hand. As soon as the region of greatest wear is located, the sweeping of the probe 73 and the movement of the table is stopped. The sweep probe is nulled, thereby establishing a reference position for the table, and the end probes 77 and 78 now indicate by an appropriate signal the amount of metal that must be removed from the roll to develop the desired surface dimensions and contour.

The grinding wheel motor is started automatically bringing the grinding wheel up to speed. Fast infeed motor $M_8$ and then slow infeed motor $M_9$ move the grinding wheel 38 toward the roll receiving their stop signals from grinding wheel probe 42. Just before the grinding wheel encounters the roll, the slow infeed motor is stopped by the probe 42 bearing on the roll and tilt motor $M_{11}$ is operated by the last-mentioned probe to bring the wheel into working contact with the roll. The degree of tilt or the feed of the grinding wheel as the roll is ground is controlled automatically by the maximum amperage-control device (FIG. 17) in circuit with the grinding wheel motor.

The grinding head short strokes on the left side of the roll, for example, until the roll is ground to within a predetermined diameter relative to the low spot. Length of stroke is controlled by a trip switch at the end of the roll adjacent the neck while the opposite end of the short stroke is controlled by recognition of a current drop in the grinding wheel motor circuit as the grinder moves off the high end and begins to grind "air."

When the end being short stroked reaches the predetermined dimension relative to the low spot, as determined by the corresponding end probe and the probe table reference position, the grinding head shifts to the opposite side and short stroking continues there until the predetermined dimension relative to the low spot is reached.

Next the grinding head is commanded to stroke along the full width of the roll until the roll is ground to within a predetermined dimension relative to the low spot.

Next the tape calls for a roll alignment operation. Although the roll axis is aligned initially for fair accuracy relative to the path traversed by the grinder, the extreme accuracy within which probes and probe carriage operate and desirability of obtaining perfectly finished roll make it highly profitable to call for a refined roll alignment step at this time. As stated previously, this step is necessary to insure that the roll is rotating about an axis which is parallel to the path traversed by the grinding wheel to develop a perfectly symmetrical finished roll. To this end the grinding wheel is temporarily withdrawn and the end probes 77 and 78 which engage the roll cyclically after each grinding stroke are moved into contact with the roll.

The probes are connected electrically and are deflected until the equation $P_1K = P_2$ is satisfied, i.e., until the signal generated by $P_1$ times a factor K (which is calculated for each roll based upon its length, diameter, distance between head stock and movable tail stock) equals the signal generated by $P_2$; assume that probe 77 is probe $P_1$ and that probe 78 is probe $P_2$.

The factor K is preset in the probe transformer circuit in the form of a selectable value of resistance (FIG. 17) when the grinder is initially set up for operation upon a given roll.

The derivation shows that when the equation is satisfied, electrically, the deflection of probe $P_2$, positively or negatively relative to its null or zero position, is a measure of the adjustment necessary at the tail stock, i.e., movable tail stock 23 (see FIG. 5) to bring the roll axis into exact alignment with the path traversed by the grinder.

The probes are disconnected electrically and motor 27 (FIG. 5) is operated until probe $P_2$ is nulled. This occurrence signals alignment.

After alignment, the programming tape signals a given number of grinding passes which from experience are adequate to clean up the roll.

Next the grinding wheel is dressed automatically and thereafter a predetermined number of light grinding passes are called for to finish grind the roll.

Finally the probes 73, 77 and 78 engage the roll and the final dimensions of the roll are recorded on a suitable readout device and the end of operations signal shuts down the grinding apparatus.

Figure 17:
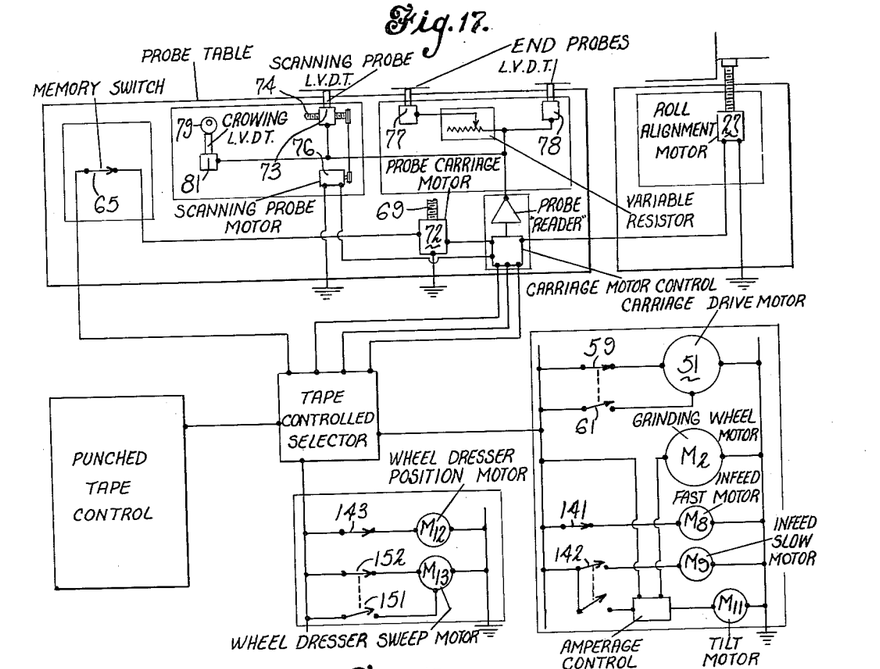
FIG. 17 is a wiring diagram of the grinding machine illustrating schematically the various motors and drive devices utilized to operate the machine automatically.

It is to be recalled that in situations where the finished contour of the roll face is concave or convex the center or scanning probe 73 is compensated electrically and automatically by the additional signal impressed on this probe by the cooperation of probe 81 and cam 79 (see FIGS. 4 and 17).

In effect, the signal impressed upon probe 73 "straightens" the concave or convex surface into a straight line for convenience in measuring.

The difference in diameter in the roll from end to end after final grinding is no greater than ±.0005 inch.

In the event that a set of rolls are being ground to the same radial dimension, the smallest roll of the set is ground first and the probe carriage position is marked by the bar 50, all as fully described above, to insure that a second or subsequent roll of initially larger dimensions may be ground to the same dimensions as the first roll.

While only one form of the applicants' apparatus for grinding rolls is illustrated in the drawings, it will be apparent to those versed in the art that changes may be made in the apparatus without departing from the principles of the invention and the scope of the appended claims.

What is claimed is:

1. An apparatus for grinding mill rolls having high and low points on a working surface of the roll comprising means for supporting the roll so that its longitudinal axis is generally parallel to a fixed reference line, first measuring means for scanning the roll to locate a low point, second measuring means cooperating with said first measuring means for indicating high points, and means cooperating with said second measuring means for moving the roll to align the roll axis in an accurate parallel relationship relative to said reference line.

2. An apparatus for grinding mill rolls having high and low points on a working surface of the roll comprising means for supporting the roll so that its longitudinal axis is generally parallel to a fixed reference line, a coordinately movable carriage, first measuring means carried by the carriage for scanning the roll to locate a lower point, second measuring means carried by the carriage and cooperating with said first measuring means for indicating high points, means for moving the carriage coordinately to bring both measuring means into working engagement with said surface of the roll, and means cooperating with said second measuring means for moving the roll to align the roll axis in an accurate parallel relationship relative to said reference line.

3. An apparatus for grinding mill rolls having high and low points on a working surface of the roll comprising means for supporting the roll so that its longitudinal axis is generally parallel to a fixed reference line, a coordinately movable carriage, first measuring means carried by the carriage for scanning the roll to locate a low point, second measuring means carried by the carriage and cooperating with said first measuring means for indicating high points, means cooperating with said second measuring means for moving the roll to align the roll axis in an accurate parallel relationship relative to said reference line, and means operated by said carriage for marking a given position of said carriage relative to said roll surface whereby the position of said measuring means relative to said roll is established.

4. An apparatus for grinding rolls comprising means for rotatably supporting a roll, a coordinately movable grinding head carrying a grinding wheel and a movable grinding wheel dresser, power means for moving said grinding wheel dresser relative to said grinding wheel, means for moving the grinding head towards the roll so that the grinding wheel is operative to grind the roll whereby the grinding wheel wears away, and means for measuring the grinding wheel and for actuating said power means to move said grinding wheel dresser relative to said grinding wheel as said wheel wears away.

5. A roll grinding apparatus comprising means for rotatably supporting and driving a roll, a grinding wheel operable to sweep to and fro across the face of the roll in a straight line, carriage means movable relative to the roll and carrying at least one measuring means operable to engage the roll and to generate a signal related to the contour of the roll, and means for driving said measuring means along a path generally parallel to the straight line along which said grinding wheel sweeps whereby the measuring means indicates the contour of the roll relative to said straight line.

6. The device of claim 5 in which the grinding apparatus is provided with an additional measuring means operative to generate a signal which is a function of a desired line of curvature, said additional signal being combined with the signal related to said contour so that the combined signals indicate the contour of the roll relative to said line of curvature.

7. The device of claim 5 in which the carriage means supports two additional measuring means fixed to the carriage means, said additional measuring means being operable to engage opposed extremities of a roll to generate respective signals which indicate the contour of the roll at said extremities relative to said straight line.

8. The device of claim 5 wherein the apparatus includes a movable grinding wheel dresser, a grinding wheel probe and power means to move the wheel dresser, said probe being operative to follow the wear of the grinding wheel and to generate a signal indicating wear of the grinding wheel and means actuated by said probe operative to activate said power means.

9. A grinding apparatus comprising a grinding wheel, a carriage for supporting the grinding wheel, a grinding wheel dresser mounted upon the carriage, a lead screw having both right-hand and left-hand threads operative to draw the wheel dresser toward the grinding wheel, electric motor means for driving the lead screw, power means including a switch in circuit with said motor means and a mechanical probe operable to sense the wear of the grinding wheel and further operable to actuate said switch to drive said motor means to draw the wheel dresser toward said grinding wheel when the wear of the wheel reaches a predetermined amount.

10. A grinding apparatus for grinding mill rolls comprising a grinding wheel operable to engage a face of the roll, a grinding wheel carriage for supporting the grinding wheel, means for supporting the mill roll, means for moving the grinding wheel carriage towards the face of the mill roll so that the grinding wheel engages the roll, a movable grinding wheel probe carried by said carriage and biased to project beyond the wheel, said probe being operable to move relative to the wheel and to engage the face of the roll before the wheel engages the roll, means for moving the grinding wheel carriage towards the roll so that the probe engages the roll and moves relative to the wheel, power means including a plurality of switches actuated by the relative motion of said wheel probe for controlling the speed with which the grinding wheel carriage and, thus, the grinding wheel approaches said roll.

11. The apparatus of claim 10 wherein the power means comprises a first infeed motor and a second infeed motor.

12. The apparatus of claim 10 wherein the power means comprises a fast infeed motor and a slow infeed motor.

13. The apparatus of claim 10 above wherein the grinding wheel probe carries a plurality of switch actuating means each individual to a particular switch.

14. The apparatus of claim 10 above wherein the switches are mounted upon a movable member and are movable collectively relative to the wheel probe and to the carriage.

15. A grinding apparatus for grinding a workpiece comprising a grinding wheel carriage for supporting a grinding wheel and for supporting a grinding wheel dresser, means for supporting the workpiece, means for moving the grinding wheel carriage towards the face of the workpiece, a movable grinding wheel probe carried by said carriage and biased to engage the workpiece, said probe being operable to move relative to said carriage upon engaging the workpiece, means for moving the grinding wheel carriage towards the workpiece to cause the probe to contact the workpiece and to cause the probe to move relative to the carriage, power means including a plurality of switches actuated by said wheel probe for controlling the speed with which the carriage approaches said workpiece and for conditioning the grinding wheel dresser for operation.

16. The apparatus of claim 15 wherein the switches actuated by the grinding wheel probe comprise a fast infeed switch, a slow infeed switch and a wheel dresser switch, the wheel probe being formed with spaced collars individual to each switch, said collars being operable to contact the switches sequentially whereby the switches are operated sequentially.

17. The apparatus of claim 15 wherein the switches actuated by the grinding wheel probe comprise a fast infeed switch, a slow infeed switch, a tilt motor switch and a wheel dresser switch.

18. The apparatus of claim 15 wherein the switches are mounted upon a movable member and are movable collectively relative to the carriage and the wheel probe.

19. A grinding apparatus comprising means for supporting a workpiece, means for movably supporting a grinding wheel, said wheel being operable to engage and grind a workpiece, means for movably supporting a grinding wheel probe, said probe being operable to engage the workpiece as it is ground, means for movably supporting a grinding wheel dresser, means for moving the grinding wheel toward the workpiece relative to the grinding wheel probe as the wheel wears away, drive means including a switch actuated by a fixed degree of relative motion between the grinding wheel and the wheel probe operative to move the wheel dresser toward the grinding wheel.

20. The grinding apparatus defined in claim 19 in which the grinding wheel and the grinding wheel dresser are supported on a single carriage.

21. The grinding apparatus defined in claim 19 in which the grinding wheel and the grinding wheel dresser are supported on a single carriage and means are provided for moving said wheel dresser relative to said wheel in at least two directions.

22. The grinding apparatus defined in claim 19 in which the grinding wheel, the grinding wheel dresser, the grinding wheel probe and the switch are supported on a single carriage and means are provided for moving the grinding wheel dresser relative to the grinding wheel and for simultaneously moving the switch and the wheel probe relative to one another.

23. A roll grinding apparatus comprising means for rotatably supporting a mill roll, a grinding head disposed on one face of the mill roll and a probe table disposed on the opposite side of the mill roll, a plurality of linearly variable differential transformers carried by the table each having an armature movable relative to the transformer individual thereto, two of said transformers being fixed to the table and spaced apart thereon, a third transformer carried by a lead screw, said lead screw being supported by the table and operative to rotate whereby said third transformer is movable to and fro in a horizontal plane between said spaced transformers and reversible motor means for driving the lead screw first in one direction to cause the movable transformer to sweep in one direction and thereafter in a reverse direction to cause the transformer to sweep in the opposite direction.

24. The device of claim 23 wherein the carriage is mounted on a base in turn mounted on a sub-base, said carriage being movable in one direction relative to said base and sub-base and said carriage and base being movable in a direction normal to said one direction operative to said sub-base whereby said carriage is coordinately movable.

References Cited in the file of this patent

UNITED STATES PATENTS

| | | |
|---|---|---|
| 1,666,237 | Fuller | Apr. 17, 1928 |
| 2,000,608 | Peaslee et al. | May 7, 1935 |